Sept. 19, 1967  E. J. BEVERS  3,342,031
GAS TURBINE FUEL CONTROL
Filed June 23, 1965
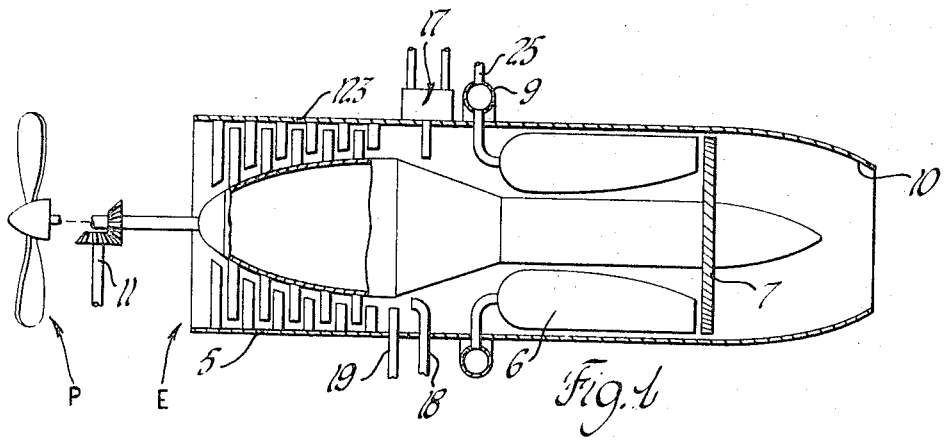
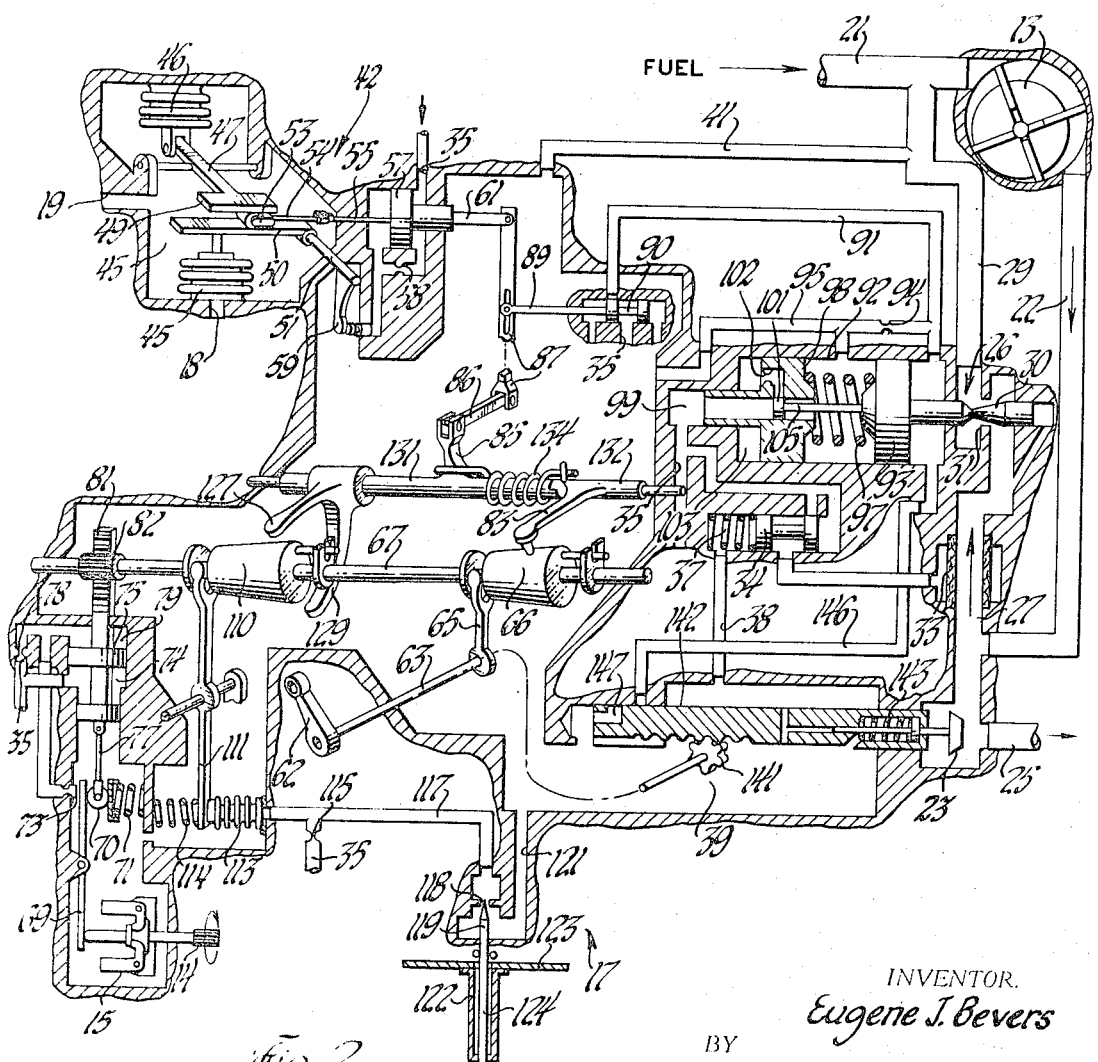
INVENTOR.
Eugene J. Bevers
BY
Paul Fitzpatrick
ATTORNEY United States Patent Office 3,342,031
Patented Sept. 19, 1967

3,342,031
GAS TURBINE FUEL CONTROL
Eugene J. Bevers, Indianapolis, Ind., assignor to General Motors Corporation, Detroit, Mich., a corporation of Delaware
Filed June 23, 1965, Ser. No. 466,310
2 Claims. (Cl. 60—39.28)

ABSTRACT OF THE DISCLOSURE

A gas turbine fuel control in which turbine inlet temperature is scheduled but not measured and the fuel metering operation of the control is based upon the ratio of total pressure to static pressure in the compressor discharge of the engine. Also, the fuel shutoff valve acts to unload the pump when it closes by bleeding pressure from a servo which acts to close a by-pass type metering valve.

---

My invention is directed to improved fuel controls for gas turbine engines, particularly suitable for turboprop aircraft engines. In general, the fuel controls for aircraft gas turbines are designed to operate the engine at a desired turbine inlet temperature, the turbine inlet temperature being the critical factor in determining engine power output and also in determining engine life. While a measurement of actual temperature in the turbine (either the inlet or outlet) may be used to control fuel or to trim the flow of fuel, it is usual practice to determine from various parameters the fuel flow required to maintain a desired turbine inlet temperature and then to control the fuel flow to this desired value. One salient disadvantage of such controls is that, for any accuracy in control of turbine temperature, the control must be calibrated for a particular fuel and recalibrated whenever the fuel is changed. The actual temperature in the engine will vary with changes in the heating value of the fuel and the measurement of fuel flow will vary with the density and viscosity of the fuel.

The principal object of my invention is to provide a gas turbine fuel control which is not adversely affected by changes in the fuel used. This end is achieved by use of a controlling parameter R where R is the ratio of total pressure in the engine compressor discharge to static pressure in the engine compressor discharge. In the preferred embodiment of my invention, this ratio is measured and fuel is adjusted to bring the value of R to a desired value. The basis for this is the fact that R may be used to provide a sufficiently accurate indirect indication of turbine inlet temperature. The value of R can be scheduled as a function of engine speed biased by burner inlet temperature, which is compressor discharge temperature, for any given power plant. It is not affected significantly by changes in fuel. My control acts to bring R to the desired value and does not measure flow, thus eliminating the effect of fuel changes on flow measurement. Thus, in effect, turbine inlet temperature is scheduled but it is not measured and the actual operation of the control is based upon the value of R, which may be set to control the engine power level. The value of R decreases as turbine temperature, and thus power output, increases.

For smooth operation of such a control, the signal of desired R should be varied with engine speed. Also, means should be provided to limit the input signal of desired R so that the engine does not run too hot or flame out from shortage of fuel. This latter function may be satisfied by a limit cam responding to engine speed and compressor discharge temperature.

In the preferred embodiment of my invention, mechanisms of types of structure generally known in fuel controls are employed to measure the controlling factors, determine the ratio R, establish the limits, and control fuel flow so as to keep the value of R at the desired point.

Preferably, a control according to my invention includes an improved fuel metering system including an improved servo system and means responsive to shutting off the fuel to unload the fuel pump.

The nature of the invention and its advantages will be apparent to those skilled in the art from the succeeding detailed description of the preferred embodiment of the invention. Referring to the drawings, FIGURE 1 is a schematic of a gas turbine propeller aircraft engine, which may be referred to as a turboprop engine, showing the sensing devices which are connected to the fuel metering system of the invention.

FIGURE 2 is a schematic diagram of a fuel pumping and controlling system for connection to the engine of FIGURE 1.

FIGURE 1 is a schematic of a gas turbine propeller prop power plant. It comprises an engine E and a propeller P driven by the engine. The engine comprises a compressor 5, combustion apparatus 6, and a turbine 7. The turbine drives the compressor and the propeller. The compressor supplies compressed air to the combustion apparatus, to which fuel is also supplied from a manifold 9. The combustion products drive the turbine and then flow through the exhaust duct 10 of the engine. The propeller ordinarily is of a speed governing type, but may be of any suitable type. An accessory drive shaft 11 geared to the engine serves, among other things, to drive a fuel pump 13 (FIGURE 2) and the input shaft 14 of a speed responsive device 15 of the fuel control. A temperature sensor 17 measures the temperature of air flowing from the compressor. A total pressure probe or pickup line 18 and a static pressure pickup line 19 are also suitably mounted in the compressor outlet.

Referring now to FIGURE 2, fuel from any suitable source such as an aircraft boost pump is supplied through line 21 to engine driven pump 13 which discharges it through a line 22 and a shutoff valve 23 to an engine fuel supply line 25 connected to manifold 9. The shutoff valve is always open during operation of the engine and is closed to cut off the fuel and shut down the engine. The pump 13 supplies an excess of fuel and the quantity supplied to the engine is controlled by a metering bypass valve 26 connected through a branch line 27 to the pump outlet and through a return line 29 to the pump inlet. The metering valve 26 comprises a tapered valve stem 30 which cooperates with an annular seat 31. Axial movement of the valve determines the area of the bypass and therefore the amount of fuel returned.

Fuel under controlled pressure to operate servomechanisms in the fuel control is taken from line 27 through a filter 33 to a pressure control valve 34. This valve balances the pressure in its discharge line 35 against the force exerted by spring 37 to maintain a constant pressure in line 35. Valve 34 is drained through a line 38 to the chamber 39 within the fuel control which is vented to the pump inlet through line 41.

The control includes a ratio determining mechanism 42 to determine the actual value of R. As illustrated schematically, the pressure ratio device includes a body defining a chamber 43 filled with air at compressor discharge static pressure from line 19. Compressor discharge total pressure is supplied from line 18 to a bellows 45 within the chamber. The bellows 45 is thus exposed to the difference of the two pressures. An evacuated bellows 46 mounted in chamber 43 is exposed to static pressure. The ratio of the two pressures is determined by the following mechanism. Static pressure exerts a force on rocker arm 47 urging bearing plate 49 downwardly. Bellows 45 exerts on upward pressure on a bearing plate 50 fixed to a rotatable shaft 51. A roller arrangement 53 determines a variable ratio pivot between the two plates. Roller mechanism 53 is adjusted by servomechanism to the position at which the forces exerted on the roller mechanism are in balance, thus determining the ratio of total pressure to static pressure which is R. Thus the movements of the roller 53 represent R. Roller mechanism 53 is shifted by link 54 hinged to a piston rod 55 fixed to a stepped servo piston 57. Piston 57 is urged to the left, as illustrated, by servo fuel pressure from line 35 exerted on the smaller area end of the piston. This servo pressure is bled through a fixed orifice 58 and an orifice varied by an arm 59 fixed to shaft 51. The resulting intermediate pressure acts against the larger face of piston 57. This is a conventional type of servomechanism. If the plate 50 moves upward, the downstream orifice is enlarged, thus reducing the pressure on the left face of piston 57 and allowing it to move to the left. This reduces the effective force ratio between bellows 45 and bellows 46 and rotates arm 59 to close the outlet and raise the pressure. Thus the ratio determining device 42 is a self-contained sensing device and servomechnaism which reciprocates output rod 61 to a position determined by the actual value of R. This provides the feedback from the engine to the means for controlling fuel.

The input or control signal which is balanced against the feedback is provided by the mechanism generally in the lower left-hand portion of FIGURE 2 including the speed responsive device 15 previously mentioned. A manually operable input or power control arm 62 is connected through a shaft 63 and forked arm 65 to shift a three-dimensional cam 66 axially of a shaft 67. The cam is coupled to shaft 67 so as to rotate with the shaft. Shaft 67 is rotated to a position determined by engine speed. Briefly, the speed responsive device 15 rotates a rocker arm 69 which bears through a ratio roller 70 against a compression spring 71. The end of arm 69 controls a bleed orifice 73. Servo fuel from line 35 is fed to a chamber 74 defined by a differential piston and piston rod assembly 75 which in turn is connected through a swingable link 77 to the ratio roller 70. Pressure from line 35 also is supplied through an orifice 78 to the chamber 79 above the piston 74 and to the variable orifice 73. Movement of the arm 69, by varying the relative pressures on piston 75, causes it to move axially to change the force ratio between spring 71 and the centrifugal device 15. The result is movement of a rack 81 as a function of engine speed. Rack 81 rotates the cam shaft 67 through a pinion 82. It will be seen therefore that three-dimensional cam 66 is reciprocated by the desired R input, which is corrected for engine speed to reflect turbine temperature correctly at different value of engine speed by rotation of the cam 66.

Cam 66 operates a follower 83 which is coupled through an arm 85 and link 86 to one end of a floating link 87, the other end of which is pivoted to the R feedback rod 61. Link 87 is moved to the left to call for more power (decrease in R). The stem 89 of a pilot valve 90 is coupled to the mid-point of floating link 87 so that the valve in in null position when the R feedback equals the desired R input. Pilot valve 90 controls flow from the servo manifold 35 through line 91 to a servo cylinder 92, and return flow to the chamber 39. Cylinder 92 contains a piston 93 to which is fixed the stem of valve 26. Piston 93 thus controls engine fuel flow. Pressure in line 91 acts against one face of piston 93 biasing it in the direction to close the bypass valve 26. Line 91 is connected through a bleed orifice 94 to a line 95 which drains the back side of piston 93 into the chamber 39. Piston 93 is biased in the direction to open the bypass valve 30 by a compression spring 97 retained between piston 93 and a second piston 98 reciprocable in cylinder 92. Piston 98 is a stepped piston. The small end of the piston is exposed to servo fuel pressure in chamber 99. A pilot valve 101 mounted within a bore in piston 98 controls flow of fluid from chamber 99 through restricted passage 102 in piston 98 to the chamber 103 between the steps of the piston, or from this chamber to the drain line 95. Valve member 101 is rigidly connected to piston 93 by a stem 105.

The operation of the fuel controlling servo is as follows: Assuming an increase power signal, pilot valve 90 will be moved to the left to increase pressure upstream of orifice 94 acting to move piston 93 to close the bypass valve. The piston thus closes the bypass valve to the point where the increased resistance of spring 97 balances the increase of servo pressure. This provides stability and a droop governing or controlling effect to the fuel servo. However, the fuel servo also embodies integrating means to cancel out the error due to the rate of spring 97, since the movement of piston 93 operates valve 101 and piston 98 follows this movement, ultimately restoring spring 97 to its normal degree of compression at the new position of valve stem 30. Thus the fuel valve has proportional plus integrating control. Movement of the valve stem 30 to the left as illustrated diminishes the fuel bypassing and increases fuel flow to the engine, thus increasing turbine temperature and engine power output. This decreases the ratio of total pressure to static pressure within the engine. The feedback of decreased R from the engine moves rod 61 to the right and thus moves valve 90 to a stable position. A request for less power acts in the obvious manner to bypass more fuel and the feedback of increased R recenters valve 90.

The control includes means for limiting the range of possible settings of the R input as a function of engine speed and compressor outlet temperature, which are parameters indicative of the settings calling for the maximum allowable value of turbine inlet temperature and for the minimum desired operating turbine temperature. This mechanism includes a three-dimensional cam 110 slidable on shaft 67 and coupled to rotate with the shaft. Rotation of the cam is thus determined by engine speed. The cam is shifted axially by a rocking lever 111 biased in one direction by a bellows 113 and in the other direction by compression spring 114. Servo fuel pressure is supplied from line 35 through an orifice 115 to a line 117 which pressurizes bellows 113 and extends to a variable orifice 118. This orifice 118 is part of the compressor outlet temperature responsive device 17. The orifice 118 is controlled by a valve needle 119 which controls bleed from line 117 through line 121 into the low pressure chamber 39. The position of valve 119 is controlled by a known type of temperature responsive mechanism such as a differential expansion device comprising a sleeve 122 fixed to the wall 123 of the engine and a stem 124 bearing the valve needle 119. The parts 122 and 124 have different coefficients of thermal expansion and are exposed to the temperature of the air flowing from the compressor. Thus this temperature determines the position of valve needle 119, thereby the pressure in line 117, the extension of bellows 113 against spring 114, and the axial position of cam 110. Cam 110 coacts with two followers 127 and 129 engageable with opposite sides of the cam, these followers being fixed to a shaft 131 from which the arm 85 previously referred to extends. The cam follower 83 for the cam 66 is fixed to a sleeve 132 coaxial with shaft 131 and having a one-way rotary connection with it. A torsion spring 134 biases the members 132 and 131 so that normally they rotate together. If acceleration limit follower 127 engages cam 110, follower 83 is held above the surface of cam 66 to limit movement in that direction. If the follower 83 moves so as to bring deceleration limit follower 129 in contact with cam 110, further movement of shaft 131 is prevented, and therefore follower 83 moves idly, winding up spring 134. Suitable means (not illustrated) are provided to bias follower 83 toward cam 66.

The shutoff valve 23 in the fuel discharge line is also controlled by input arm 62 through a suitable connection so that valve 23 is moved to shut off fuel to the engine when the power control is moved to the "Off" position. As illustrated, this comprises a pinion 141 meshing with a reciprocable rack 142. This rack has a lost motion connection through spring 143 with the valve plug 23. A venting line 146 extending from the servo cylinder 92 is normally closed, but is opened by a valve passage 147 in the rack 142 when valve 23 is closed. This is a highly desirable feature since, by venting the pressure acting on piston 93, the compression spring 97 is allowed to move bypass valve 30 to its full open position. This allows the greatest return flow and minimizes back pressure in the pump 13 during coast-down of the engine.

The detailed description of the preferred embodiment of the invention for the purpose of explaining the principles thereof is not to be considered as limiting or restricting the invention, as many modifications may be made by the exercise of the skill in the art.

I claim:

1. A fuel control system for a gas turbine engine comprising, in combination,
   means responsive to compressor discharge total pressure in the engine
   means responsive to compressor discharge static pressure in the engine
   means actuated by the aforementioned means for providing an output of actual R, where R is the ratio of total to static pressure
   operable input means for setting a desired engine power level
   means sensing engine speed
   means actuated primarily by the input means and the sensing means for generating a signal of desired R, and
   means responsive to the actual R output and the desired R signal controlling engine fuel so as to adjust the actual R to equal desired R.

2. A fuel control system for a gas turbine engine comprising, in combination,
   means responsive to compressor discharge total pressure in the engine
   means responsive to compressor discharge static pressure in the engine
   means actuated by the aforementioned means for providing an output of actual R, where R is the ratio of total to static pressure
   operable input means for setting a desired engine power level
   means sensing engine speed
   means sensing compressor discharge temperature in the engine
   means actuated by the input means and the engine speed sensing means for generating a signal of desired R
   means actuated by the two said sensing means for limiting the signal of desired R, and
   means responsive to the actual R output and the desired R signal controlling engine fuel so as to adjust the actual R to equal desired R.

References Cited

UNITED STATES PATENTS

| | | | |
|---|---|---|---|
| 2,641,105 | 6/1953 | Drake | 60—39.28 X |
| 2,658,566 | 10/1953 | Wirth et al. | 158—36.4 |
| 2,695,055 | 11/1954 | Cruckshank | 158—36.4 |
| 2,714,803 | 8/1955 | Abild | 60—39.28 |
| 2,761,280 | 9/1956 | Atkinson | 60—39.28 X |
| 2,809,492 | 10/1957 | Arkawy | 60—39.28 |
| 2,857,739 | 10/1958 | Wright | 60—39.28 |
| 2,968,915 | 1/1961 | Feistel | 60—19 |

JULIUS E. WEST, *Primary Examiner.*

UNITED STATES PATENT OFFICE
CERTIFICATE OF CORRECTION

Patent No. 3,342,031 September 19, 1967

Eugene J. Bevers

It is hereby certified that error appears in the above numbered patent requiring correction and that the said Letters Patent should read as corrected below.

Column 2, lines 19 and 20, strike out "FIGURE 1 is a schematic of a gas turbine propeller prop ' power plant." and insert instead -- FIGURE 1 is a conventional representation of a turboprop power plant. --; column 3, line 61, for "in", first occurrence, read -- is --.

Signed and sealed this 5th day of October 1968.

(SEAL)
Attest:

Edward M. Fletcher, Jr.
Attesting Officer

EDWARD J. BRENNER
Commissioner of Patents